US010238136B2

(12) United States Patent
Nadeau et al.

(10) Patent No.: US 10,238,136 B2
(45) Date of Patent: Mar. 26, 2019

(54) PROCESS FOR PREPARING A PET FOOD COMPOSITION

(75) Inventors: Douglas Nadeau, Topeka, KS (US); David Kappelman, Olathe, KS (US); Luis J. Montelongo, Lawrence, KS (US)

(73) Assignee: Colgate-Palmolive Company, New York, NY (US)

( * ) Notice: Subject to any disclaimer, the term of this patent is extended or adjusted under 35 U.S.C. 154(b) by 403 days.

(21) Appl. No.: 14/349,396

(22) PCT Filed: Oct. 14, 2011

(86) PCT No.: PCT/US2011/056343
§ 371 (c)(1),
(2), (4) Date: Apr. 3, 2014

(87) PCT Pub. No.: WO2013/055360
PCT Pub. Date: Apr. 18, 2013

(65) Prior Publication Data
US 2014/0242228 A1    Aug. 28, 2014

(51) Int. Cl.
| | |
|---|---|
| A23K 40/00 | (2016.01) |
| A23K 50/40 | (2016.01) |
| A23L 29/256 | (2016.01) |
| A23K 10/20 | (2016.01) |
| A23K 20/174 | (2016.01) |
| A23K 20/163 | (2016.01) |
| A23L 13/40 | (2016.01) |
| A23J 3/22 | (2006.01) |

(52) U.S. Cl.
CPC ............ *A23L 29/256* (2016.08); *A23K 10/20* (2016.05); *A23K 20/163* (2016.05); *A23K 20/174* (2016.05); *A23L 13/422* (2016.08); *A23J 3/227* (2013.01); *A23K 40/00* (2016.05)

(58) Field of Classification Search
CPC ........ A23K 40/25; A23K 50/40; A23K 50/45; A23K 50/48; A23J 1/009; A23J 3/20; A23J 3/225; A23J 3/227
USPC .......................................................... 426/805
See application file for complete search history.

(56) References Cited

U.S. PATENT DOCUMENTS

| | | | |
|---|---|---|---|
| 3,615,589 A | 10/1971 | Spek | |
| 3,891,776 A | 6/1975 | Carpenter et al. | |
| 3,965,259 A * | 6/1976 | Coppage | A23J 3/227 426/805 |
| 4,276,311 A | 6/1981 | Burrows et al. | |
| 4,348,418 A | 9/1982 | Smith et al. | |
| 4,362,748 A | 12/1982 | Cox | |
| 4,377,597 A | 3/1983 | Shapiro et al. | |
| 4,423,083 A | 12/1983 | Shenouda | |
| 4,430,349 A * | 2/1984 | Malone | A23C 9/1307 426/34 |
| 4,603,054 A | 7/1986 | Schmitt et al. | |
| 4,643,908 A * | 2/1987 | Sawhill | A23K 50/45 426/630 |
| 4,781,939 A | 11/1988 | Martin et al. | |
| 4,784,862 A | 11/1988 | Wotherspoon | |
| 4,791,002 A | 12/1988 | Baker et al. | |
| 4,895,731 A | 1/1990 | Baker et al. | |
| 5,132,137 A | 7/1992 | Reimann et al. | |
| 5,422,135 A * | 6/1995 | Speirs | A23L 29/256 426/513 |
| 5,433,968 A | 7/1995 | Zarraga et al. | |
| 5,456,933 A | 10/1995 | Lee | |
| 5,658,605 A | 8/1997 | Soeda et al. | |
| 5,693,356 A | 12/1997 | Mandava et al. | |
| 5,792,504 A | 8/1998 | Poppel et al. | |
| 6,379,738 B1 | 4/2002 | Dingman et al. | |
| 6,436,463 B1 | 8/2002 | Cheuk et al. | |
| 6,440,485 B1 | 8/2002 | Cheuk et al. | |
| 6,635,301 B1 | 10/2003 | Howsam | |
| 6,649,206 B2 | 11/2003 | Dingman et al. | |
| 6,885,978 B2 | 4/2005 | Chu et al. | |
| 6,911,224 B1 | 6/2005 | May et al. | |
| 7,211,280 B1 * | 5/2007 | Young | A23K 20/174 426/2 |
| 7,736,686 B2 | 6/2010 | Dingman et al. | |
| 7,842,329 B2 | 11/2010 | Saylock et al. | |
| 8,524,299 B2 | 9/2013 | Brent, Jr. | |
| 2001/0041202 A1 | 11/2001 | DuPont et al. | |
| 2002/0106442 A1 | 8/2002 | Dingman et al. | |

(Continued)

FOREIGN PATENT DOCUMENTS

| | | |
|---|---|---|
| AU | 495353 | 1/1976 |
| DE | 2945878 | 5/1981 |

(Continued)

OTHER PUBLICATIONS

Olukosi, Meat and Bone Meal Good Energy Source for Swine, Jun. 2009, Render magazine, p. 10-11. (Year: 2009).*
Association of American Feed Control Officials (AAFCO) Official Publication 2003 pp. 126-140.
International Search Report and the Written Opinion issued in International Application PCT/US2011/56343 dated May Dec. 16, 2011. WO.
Written Opinion of the International Preliminary Examining Authority issued in International Application PCT/US2011/56343 dated Oct. 29, 2013. WO.
Kimica Corp., 2008, "Usage of alginic acid" Marine Biopolymers <URL, https://web.archive.org/web/20090324051716/http://www.kimica.jp/alginate/usage>.

(Continued)

*Primary Examiner* — Walter A Moore

(57) ABSTRACT

The disclosure provides method for preparing a food product is described which includes mixing a dry ingredient composition, a protein-containing composition, and an alginate composition to provide a first mixture, mixing the first mixture with a setting composition to effect a controlled rate gelation reaction, and processing the product of the gelation reaction to provide a food product. The disclosure also provides pet food compositions comprising food products prepared according to the disclosed process.

24 Claims, No Drawings

(56) References Cited

U.S. PATENT DOCUMENTS

| | | |
|---|---|---|
| 2003/0148000 A1 | 8/2003 | Miller et al. |
| 2003/0165472 A1* | 9/2003 | McGrath ............... A01K 5/02 |
| | | 424/93.4 |
| 2003/0211228 A1* | 11/2003 | Ballard ................. A23J 3/227 |
| | | 426/641 |
| 2004/0044028 A1 | 3/2004 | Obukowicz |
| 2004/0081638 A1 | 4/2004 | Kyle |
| 2004/0170750 A1 | 9/2004 | Bunick et al. |
| 2005/0095338 A1 | 5/2005 | Fernandes et al. |
| 2005/0208104 A1 | 9/2005 | Gross et al. |
| 2005/0260306 A1 | 11/2005 | Baldus |
| 2006/0210675 A1 | 9/2006 | Gifford |
| 2007/0128336 A1 | 6/2007 | Saylock et al. |
| 2007/0148323 A1 | 6/2007 | Dingman et al. |
| 2008/0003270 A1 | 1/2008 | Garcia |
| 2008/0003338 A1 | 1/2008 | Barnvos et al. |
| 2008/0233244 A1* | 9/2008 | Swenson ............... A23J 3/16 |
| | | 426/72 |
| 2008/0260913 A1 | 10/2008 | Orcutt et al. |
| 2008/0268093 A1 | 10/2008 | Bowman et al. |
| 2008/0299251 A1 | 12/2008 | Clark et al. |
| 2009/0208612 A1 | 8/2009 | Reiser et al. |
| 2009/0214738 A1 | 8/2009 | Dierking et al. |
| 2010/0003391 A1* | 1/2010 | Melnyczuk ........... B01F 5/0451 |
| | | 426/573 |
| 2010/0022636 A1* | 1/2010 | Friesen ................. A61K 31/10 |
| | | 514/458 |
| 2010/0159113 A1* | 6/2010 | Hayek ................... A23K 1/14 |
| | | 426/623 |
| 2010/0166935 A1 | 7/2010 | Peskin et al. |
| 2010/0166940 A1 | 7/2010 | McMindes et al. |
| 2010/0222279 A1 | 9/2010 | Gross et al. |
| 2011/0039949 A1 | 2/2011 | Saylock et al. |
| 2011/0111102 A1 | 5/2011 | Saylock |

FOREIGN PATENT DOCUMENTS

| | | | |
|---|---|---|---|
| EP | 0173555 | 3/1986 | |
| EP | 0345886 A2 * | 12/1989 | ........... A23C 9/1546 |
| EP | 0191572 | 8/1991 | |
| EP | 0620980 | 10/1994 | |
| EP | 1369423 | 12/2003 | |
| GB | 1474629 | 5/1977 | |
| GB | 1549196 | 8/1979 | |
| GB | 1579324 | 11/1980 | |
| GB | 2058539 | 4/1981 | |
| GB | 2149639 | 6/1985 | |
| JP | S52-013877 A | 2/1977 | |
| JP | S58-163430 A | 9/1983 | |
| JP | H02-27952 A | 1/1990 | |
| JP | H02-131545 A | 5/1990 | |
| JP | 2007-097416 A | 4/2007 | |
| KR | 950004427 | 5/1995 | |
| WO | WO 9303627 A1 * | 3/1993 | ............. A23L 1/005 |
| WO | WO 97/002760 | 1/1997 | |
| WO | WO 98/018349 | 5/1998 | |
| WO | WO 99/034695 | 7/1999 | |
| WO | WO 00/036930 | 6/2000 | |
| WO | WO 01/001792 | 1/2001 | |
| WO | WO 02/096223 | 12/2002 | |
| WO | WO 03/007733 | 1/2003 | |
| WO | WO 08/085293 | 7/2008 | |

OTHER PUBLICATIONS

Ali et al., 2005, "Comparative study of body composition of different fish species from brackish water pond," Int. J. Environ. Sci. Tech. 2(3):229-232.

Bender, 1998, "Chapter 2—Role of meat and meat products in human nutrition," Meat and Meat Products in Human Nutrition in Developing Countries from FAO website http://www.fao.org/docrep/t0562e/T0562E00.htm.

Conde Nast, 2014, "SELF Nutrition Data: Know What You Eat," Nutrition Facts and Analysis for Beef, variety meats and by-products, spleen, cooked . . . http://nutritiondata.self.com/facts/beef-products/3477/2 website.

Field et al., 1974, "Bone composition cattle, pigs, sheep and poultry," J. Animal Science 39:493-499.

Food Safety and Inspection Service, 1996, "Water Meats," from USDA website http://www.fsis.usda.gov.

How Much Protein, 2009, "High Protein Meats" http://www.howmuchprotein.com/meat-high-in-protein.php.

Pla et al., 2004, "Protein, fat and moisture content of retail cuts of rabbit meat evaluated with the NIRS methodology," World Rabbit Science 12:149-158.

Wikipedia, 2014, "Meat," www.wikipedia.com/wiki/Meat website.

So, 1995, "Instant Sliced Rice Cake and Its Preparation by Steaming, Mixing Coating and Packaging," WPI Thomson Database AN: 1997-010024, KR950004427B.

* cited by examiner

PROCESS FOR PREPARING A PET FOOD COMPOSITION

CROSS-REFERENCE TO RELATED PATENT APPLICATIONS

The present application is a U.S. national stage entry under 35 U.S.C. § 371 of Patent Cooperation Treaty Patent Application No. PCT/US2011/56343, filed Oct. 14, 2011, the entirety of which is incorporated herein by reference.

FIELD OF THE INVENTION

This invention is directed generally to processes for preparing pet food compositions and particularly to processes for preparing restructured meat and meat-analogue pieces.

BACKGROUND OF THE INVENTION

Animals have been fed "dry" and "wet" food compositions for many years. "Wet" food compositions are generally packaged in can-like containers and are considered "wet" in appearance because of the moisture contained therein. Two types of wet food products are generally known in the art. The first is known in the art as either a "minced" or "ground loaf" product. Loaf products are typically prepared by contacting a mixture of components under heat to produce an essentially homogeneous, intracellular honeycomb-type mass or "ground loaf." The ground loaf mass is then packaged into a cylindrical container, such as a can. Upon packing, ground loaf assumes the shape of the container such that the ground loaf must be cut when serving to an animal. As a result of processing, ground loaf products exhibit a wide range of textural differences and loaf products generally do not mix well with other forms of foods, especially dry products.

Another type of wet product is generally known in the art as "chunk and gravy." Chunk and gravy products comprise restructured meat pieces prepared by making a meat emulsion which is first extruded and formed or "set" by physical pressure or thermal energy such as cooking with steam, cooking in water, frying in oil, oven dry heat and the like. The product pieces are eventually mixed with a gravy or sauce in a container, usually a can, which is then seamed and sterilized. As opposed to ground loaf, chunk and gravy products have physically separate, discrete chunks as prepared. These discrete particles are present in the gravy-type liquid in the final container. When serving, chunk and gravy products flow out of the can and can be easily mixed with other dry products.

These types of wet pet food compositions generally require high amounts of protein to form the desired product type as the thermal processing "sets" the product through protein denaturation.

There is, therefore, a need in the art for improved methods of making a food composition comprising restructured meat pieces and meat analogue pieces. More specifically, there is a need in the art for a method of making aesthetically-pleasing restructured meat pieces and meat analogue pieces, where that method utilizes a gelation effect in the formation of restructured meat chunks to solidify protein/starch matrices, resulting in a process that is less dependent on protein content for structural integrity of the meat chunk.

BRIEF SUMMARY OF THE INVENTION

The present invention provides a method for preparing a food product, the method comprising mixing a dry ingredient composition, a protein-containing composition, and an alginate composition to provide a first mixture; mixing the first mixture with a setting composition to effect a gelation reaction, wherein the setting composition comprises a source of calcium ions; and processing the product of the gelation reaction to provide the food product, wherein the food product has a stable structure prior to retort.

In one embodiment, the food product forms restructured meat pieces and meat analogue pieces that are structurally stable prior to retort.

In another embodiment, the food product forms restructured meat pieces or meat analogue pieces having a striated structure that are structurally stable prior to retort.

In another embodiment, the food product forms irregularly-shaped, restructured meat pieces and meat analogue pieces having a striated structure that are structurally stable prior to retort.

The present invention also provides methods for preparing a pet food composition.

In one embodiment, the pet food composition is prepared by the method described above, further comprising combining the food product with a gravy composition.

In another embodiment, the present invention provides a method for preparing a pet food composition, the method comprising mixing a dry ingredient composition, a protein-containing composition, and an alginate composition to provide a first mixture; mixing the first mixture with a setting composition to effect a gelation reaction, wherein the setting composition comprises a source of calcium ions; processing the product of the gelation reaction to provide irregularly-shaped restructured meat pieces, wherein the restructured meat pieces have a stable structure prior to retort; and combining the irregularly-shaped restructured meat pieces with a gravy composition to provide the pet food composition.

In another embodiment, the present invention provides a food product prepared by a process comprising mixing a dry ingredient composition, a protein-containing composition, and an alginate composition to provide a first mixture; mixing the first mixture with a setting composition to effect a controlled-rate gelation reaction, wherein the setting composition comprises a source of calcium ions; and processing the product of the gelation reaction to provide the food product, wherein the formed meat piece has a stable structure prior to retort.

These and other objects are achieved using the novel method of the present disclosure which comprises, in certain embodiments, mixing a dry ingredient composition, a protein-containing composition, and an alginate composition to provide a first mixture, and mixing the first mixture with a setting composition to effect a gelation reaction, and processing the product of the gelation reaction to provide the food product. That food product may, in various embodiments, comprise irregularly-shaped, restructured meat pieces and meat analogue pieces having a striated structure that are structurally stable prior to retort.

DETAILED DESCRIPTION OF THE INVENTION

The following description of the preferred embodiment(s) is merely exemplary in nature and is in no way intended to limit the invention, its application, or uses.

In one aspect, the present invention provides a process for preparing a food composition. In one embodiment, the process comprises a method for preparing a food product that comprises (a) mixing a dry ingredient composition, a protein-containing composition, and an alginate composition to provide a first mixture; (b) mixing the first mixture with a setting composition to effect a gelation reaction, wherein the setting composition comprises a source of calcium ions; and (c) processing the product of the gelation reaction to provide the food product. wherein the food product has a stable structure prior to retort.

As used herein, the phrase "restructured meat piece" refers to the shaped products of the method disclosed herein that comprise meat components from one or more sources that have been formed into stable structures that resemble animal muscle pieces in one or more of size, shape, texture, color, and flavor. The restructured meat pieces of the present disclosure may further comprise proteinaceous material from non-animal sources, but the proteinaceous material is predominantly of animal origin.

As used herein, the phrase "restructured meat analogue piece" refers to a restructured meat piece prepared by the method of the disclosure in which the predominant amount of proteinaceous material is from non-animal sources. In various embodiments, the restructured meat analogue pieces, substantially all of the proteinaceous material is from non-animal sources. Accordingly, the proteinaceous material of the restructured meat analogue pieces of the disclosure may comprise, consist essentially of, or consist of non-animal proteinaceous material.

As used herein, the phrase "striated structure" indicates that faces of restructured meat and meat analogue pieces of the present disclosure possess visible bands or striations that resemble the patterns created by the parallel fibers of skeletal muscle.

In one embodiment, the food product of the method is a restructured meat or meat-analogue piece that is structurally stable prior to retort. In a further aspect of this embodiment, the restructured meat pieces or meat analogue pieces are irregularly shaped, while in another aspect the restructured meat pieces or meat analogue pieces are irregularly shaped and/or have a striated structure.

The food products produced according to the present disclosure can be nutritionally and organoleptically adapted for consumption by any animal, including a human. In certain embodiments the food product of the present disclosure is nutritionally and organoleptically adapted for animals of the order Carnivora, e.g., for a feline or canine animal.

The size of the restructured meat pieces and restructured meat analogue pieces prepared by the methods of the present disclosure will be consistent with the intended use. For example, where the meat and meat analogue pieces are intended for use in a chunk-and-gravy canine food composition, each dimension of the piece can have a value independently selected from within a range of from about 5 to about 50 mm, within a range of from about 7.5 to about 45 mm, within a range of from about 10 to about 40 mm, within a range of from about 12.5 to about 35 mm, and within a range of from about 15 to about 30 mm. These size ranges can be adjusted up and down depending, e.g, on the size and age of the animal for which the food is intended. Where the food product is intended for a feline, for example, the size ranges of the restructured meat pieces and restructured meat analogue pieces prepared by the methods of the present disclosure will generally be selected from among the lower size ranges indicated for canines.

In other embodiments in which where the meat and meat analogue pieces are intended for use in a hash-, minced-, loaf-, or hybrid-type food composition, in which each dimension of the piece can have a value independently selected from within a range of from about 1 to about 17.5 mm, within a range of from about 2 to about 15 mm, within a range of from about 3 to about 12.5 mm, within a range of from about 4 to about 10 mm, and within a range of from about 5 to about 8 mm. These size ranges can be adjusted up and down depending, e.g, on the size and age of the animal for which the food is intended. Again, where the food product is intended for a feline, for example, the size ranges of the restructured meat pieces and restructured meat analogue pieces prepared by the methods of the present disclosure will generally be selected from among the lower size ranges indicated.

In certain embodiments, the dry ingredient composition may comprise pre-ground cereal grains and fibers, and may further comprise suitable vitamin mixtures, mineral mixtures, colorants, trace calcium sequesterants, and minor nutrients. In one illustrative aspect of this embodiment, the calcium sequesterant is sodium tripolyphosphate. In another aspect, the minor nutrients may include, but are not limited to, taurine, choline, carnitine, and combinations thereof. The specific components of the dry ingredient composition, identified in a specified formula, are weighed and mixed together to provide the dry ingredient composition. In certain embodiments, e.g., those in which the formula specification provides for a non-animal proteinaceous material, such as defatted soy flour, rice flour, wheat flour and the like, may be included in the dry ingredient composition rather than in the protein-containing composition. Accordingly, the terms protein-containing composition and dry ingredient composition are not necessarily intended to be mutually exclusive; i.e., as above, some specific materials may be included in one or the other—or both—of the protein-containing composition and dry ingredient composition.

In certain embodiments, the protein-containing composition comprises meat and meat by-products. In this aspect of the disclosed method, for example, frozen meat and meat by-products blocks are ground through a 0.32 cm to 1.27 cm plate using conventional meat processing equipment to provide the protein-containing composition. When present, suitable meat and meat by products may be selected from but are not limited to pork liver, chicken, and pork lungs. In other aspects of this embodiment, protein-containing composition can be prepared to include animal protein available from a wide variety of additional meats and meat sources including, for example, those selected from the group consisting of animal muscle, animal skeletal meat, animal by-products, and mixtures of muscle, skeletal meat and by-products. Meats include, for example, the flesh of poultry, fish, and mammals (e.g., cattle, swine, sheep, goats, and the like). Meat by-products include, for example, lungs, kidneys, livers, tongues, stomachs and intestines. Suitable meat sources may include fresh and frozen meats or meat by-products. In certain embodiments, the meat component of the protein-containing composition is generally prepared by grinding the meat through different grind-plates, typically ranging from about 1.27 cm to about 2.54 cm in size, to form discrete food particles.

The meat mixture incorporated into a protein-containing composition used in the present methods may be prepared in any suitable mixing apparatus known to one skilled in the art. Non-limiting examples of suitable apparatus for preparing the meat component include a twin screw mixer, a twin ribbon mixer, an overlapping paddle mixer, or a combination mixer such as a screw/ribbon/paddle.

In a specific embodiment, the protein-containing composition can include egg whites, either as a fluid component or as dried egg whites. In other embodiments, the protein-containing composition may include, consist essentially of, or consist of non-animal proteinaceous materials, including but not limited to defatted soy flour, rice flour, corn flour, wheat flour, barley flour, rye flour, vegetable protein, protein hydrolysates, and combinations of two or more thereof. The protein-containing composition may include, consist essentially of, or consist of animal protein sources including but not limited to, poultry, beef, lamb and fish.

Alginates are hydrophilic derivatives of alginic acid, a polysaccharide composed of beta-D-mannuronic acid residues linked so that the carboxyl group of each unit is free, while the aldehyde group is shielded by a glycosidic linkage. Alginates suitable for use in the present methods include alkali metal alginate salts such as potassium and sodium alginate, and mixtures thereof. The alginate composition of the present disclosure is generally a suspension, hydrocolloid, or solution prepared by contacting a suitable alginate, e.g., potassium or sodium alginate, with water. In one embodiment, this can be accomplished using an in-line or batch-type high-shear mixer. In certain embodiments, dissolution of the alginate can be facilitated by contacting the alginate with an oil-based component of the composition. In one aspect the oil-based component is soybean oil. In certain embodiments sodium or potassium alginate is present in the alginate composition at a weight % level (as compared to the total weight of the alginate composition) within the range of from about 0.1 to about 10%, from about 0.25 to about 9%, from about 0.5 to about 8.5%, from about 0.75 to about 8%, from about 1 to about 7.5%, from about 1.25 to about 7%, from about 1.5 to about 6.5%, from about 2 to about 6%, from about 2.5 to about 5.5%, and from about 3 to about 5%. In a specific embodiment, sodium or potassium alginate is present in the alginate composition at a level of about 4% on a weight basis.

In certain embodiments the alginate composition comprises an oil, e.g., soybean oil. When present, the oil is included in the alginate composition at a weight % level (as compared to the total weight of the alginate composition) within the range of from about 0.1 to about 10%, from about 0.25 to about 9%, from about 0.5 to about 8.5%, from about 0.75 to about 8%, from about 1 to about 7.5%, from about 1.25 to about 7%, from about 1.5 to about 6.5%, from about 2 to about 6%, from about 2.5 to about 5.5%, and from about 3 to about 5%. In a specific embodiment, the oil is soybean oil and is present in the alginate composition at a level of about 4% on a weight basis.

In one embodiment, the setting composition is a solution, which may comprise divalent-cation containing salts, including but not limited to calcium chloride, calcium lactate, calcium lactate gluconate, dicalcium phosphate (i.e., calcium monohydrogen phosphate or dibasic calcium phosphate; either as the dihydrate or anhydrous form), calcium sulfate or calcium carbonate. Although salts of strontium, barium, nickel, lead, cadmium, and cobalt are also useful in gelation reaction, such salts have limited usage in food applications due to toxicity. In other specific embodiments, one or more of the aforementioned salts are combined with water and one or more materials selected from among a gum, e.g., guar gum, to adjust viscosity, a liquid palatant, and a dry palatant.

In other embodiments, the setting composition is a solution comprising one or more of calcium chloride, calcium lactate, calcium lactate gluconate, dicalcium phosphate, calcium sulfate, and calcium carbonate.

In certain embodiments the setting composition comprises calcium chloride at a weight % level (as compared to the total weight of the setting composition) within the range of from about 0.25 to about 20%, from about 0.5 to about 17.5%, from about 1 to about 15%, from about 1.5 to about 14.5%, from about 2 to about 14%, from about 2.5 to about 13.5%, from about 3 to about 13%, from about 3.5 to about 12.5%, from about 4 to about 12%, from about 4.5 to about 11.5%, from about 5 to about 11%, from about 5 to about 10%, and from about 6 to about 9%.

In certain embodiments the setting composition comprises anhydrous dicalcium phosphate at a weight % level (as compared to the total weight of the setting composition) within the range of from about 0.05 to about 10%, from about 0.1 to about 9%, from about 0.25 to about 8.5%, from about 0.5 to about 8%, from about 2 to about 14%, from about 2.5 to about 13.5%, from about 3 to about 13%, from about 1 to about 7.5%, from about 1.5 to about 7.5%, and from about 2 to about 6.5%. In a specific embodiment, anhydrous dicalcium phosphate is present in the setting composition at a level of about 4% on a weight basis. Where the dehydrate form of dicalcium phosphate is employed, it is used at levels proportionately higher than the levels of the anhydrous material.

In certain embodiments, the rate of the gelation is controlled, at least in part, by adjusting the pH level, e.g., in the first mixture, and including one or more of calcium chloride, dicalcium phosphate, calcium sulfate, and calcium carbonate in the setting composition. In another aspect of these embodiments, the rate of the gelation is controlled, at least in part, by the inclusion of calcium ion sequesterants. In a further aspect of these embodiments, the rate of the gelation is controlled, at least in part, by the inclusion of encapsulated calcium sources such as encapsulated calcium lactate. In other aspects of these embodiments, the rate of gelation is controlled by adjusting more than one of the above variables.

In certain embodiments, the gelation reaction is controlled in such a manner that the process of the present disclosure can be run as a continuous process and, in one aspect of this embodiment, the process of the present disclosure can be run as a largely-automated, continuous, commercial-scale process.

In certain embodiments the food product is combined with a gravy to provide, e.g., a chunk and gravy composition, a hash-type food, a minced-type food, a loaf-type food, or a hybrid-type food pet food composition. The gravy may comprise one or more of the following components: starches, gums, colorants, emulsifiers, salts, and palatants. In specific embodiments, the gravy components are hydrated in a high shear mixer with the amount of water, as set forth in the formulation. If necessary or desired, e.g., where the gravy is starch-based, the resulting composition can be cooked to approximately 82° C.

In certain embodiments, the viscosity of the gravy is sufficient to suspend the restructured meat and meat analogue pieces throughout a filling and canning operation to ensure a consistent ratio of such pieces to gravy, e.g., in a 'one stage' container-filling process in which a composition comprising both the gravy and the restructured meat and meat analogue pieces are added directly to the container or can. In other embodiments, e.g., "two-stage" filling processes, the gravy and the restructured meat and meat analogue pieces are added to the containers separately. In one aspect of the latter process, the restructured meat and meat analogue pieces are deposited in the containers or cans in a first step that is followed by a second, gravy-deposit, step.

In certain embodiments, the pet food composition comprises sodium or potassium alginate. The sodium or potassium alginate is present in pet food composition at a weight % level (as compared to the total weight of the pet food composition) within the range of from about 0.01 to about 5%, from about 0.05 to about 4.5%, from about 0.1 to about 4%, from about 0.25 to about 3.5%, and from about 0.5 to about 3%. In a specific embodiment, sodium or potassium alginate is present in the pet food composition at a level of about 0.5% on a weight basis.

In certain embodiments, the pet food composition comprises a source of calcium ions contributed from the setting composition. The source of calcium ions contributed from the setting composition is present in the pet food composition at a weight % level (as compared to the total weight of the pet food composition) within the range of from about 0.01 to about 5%, from about 0.05 to about 4.5%, from about 0.1 to about 4%, from about 0.25 to about 3.5%, and from about 0.5 to about 3%. In a specific embodiment, the source of calcium ions contributed from the setting composition is present in the pet food composition at a level of about 0.5% on a weight basis. In a specific embodiment, the source of calcium ions is calcium chloride.

In certain embodiments the components combined in the methods of the present disclosure include a dry ingredient composition, a protein-containing composition, an alginate composition, and a setting composition, which are combined and processed to provide a food product. In one aspect of this embodiment, the dry ingredient composition, the protein-containing composition, and the alginate composition are each prepared separately, e.g., in parallel, and then combined and mixed to provide a first mixture. In this instance, the weight ratio of the mixture includes, on a weight % basis (as compared to the total weight of the food product), about 20% dry ingredient composition, about 50% protein containing composition, and about 10% alginate composition, to provide the first mixture representing approximately 90% of the total weight of the food product. The first mixture and the setting composition are then combined with the latter representing approximately 10% of the total weight of the food product.

In one embodiment, the first mixture and the setting solution are combined using a helical static mixer fitted with a "T-pipe" inlet. In one aspect of this embodiment the first mixture and setting solution are separately pumped into the helical static mixer at relative metered rates of 9:1, i.e., nine parts of mixture to one part of setting solution to initiate the controlled-rate gelation reaction involving creation of ionic bonds between alginate polymers mediated by the divalent cations of the setting solution. The rate of the gelation reaction is controlled by attention to the variables identified above, including, for example, the pH of the first mixture, the concentration of alginate in the first mixture, the concentration and pH-dependent solubility of the divalent-cation-containing salts of the setting solution, and the concentration, and avidity of any divalent metal ion sequestering agents that are present in the mixture. The addition of the alginate composition to the setting composition forms a structurally stable food product prior to retort and does not require a pre-retort or heating and cooling cycle. In one aspect of this embodiment, the folding action of the helical static mixer produces a striated, meat-like appearance in the formed food product extruded from the mixer. Traditional mixers such as a ribbon or paddle mixer, or other forms of mixing apparatus such as a progressive cavity pump, do not produce the striated meat-like appearance.

In one embodiment, the food product extruded from the mixer is cut with a variable speed knife to provide the food product in the form of variable-length strips or blocks. In another aspect of this embodiment, the product of the gelation reaction, extruded from the static helical mixer is conveyed to a multi-dimensional dicer where both length and width can be altered to provide irregularly-shaped restructured meat pieces and irregularly-shaped restructured meat analogue pieces having dimensions suitable for the intended use of the food product.

In a still further aspect of this embodiment, the formed, sized, and shaped meat and meat-analogue pieces prepared according to the disclosed method are combined with gravy and one or more optional inclusions selected from among vegetables, pasta, grains, rice and legumes, e.g., potatoes, carrots, peas, peppers and the like, each by weight in their respective formula amounts. The components are mixed, using for example a single ribbon, double ribbon, or planetary mixer, to provide a homogenous mixture, which can then be pumped to a can line seamer and filler. The cans are then sealed and heated (retorted) according to conventional practice. In an alternative aspect, the formed, sized, and shaped meat and meat-analogue pieces prepared according to the disclosed method are added directly to containers, e.g. cans, after which the gravy-optional inclusion mixture subsequently deposited before sealing and retorting.

In another embodiment, the formed, sized, and shaped meat and meat-analogue pieces prepared according to the disclosed method are flash frozen to provide a preserved food product. In one aspect of this embodiment, the formed, sized, and shaped meat and meat-analogue pieces prepared according to the disclosed method are combined with gravy and one or more optional inclusions before flash-freezing.

In another embodiment, the formed, sized, and shaped meat and meat-analogue pieces prepared according to the disclosed method are transferred to suitable plastic bags and vacuum-cooked, generally according to conventional sous-vide methods. In one aspect of this embodiment, the formed, sized, and shaped meat and meat-analogue pieces prepared according to the disclosed method are combined with gravy and one or more optional inclusions and transferred to suitable plastic bags and vacuum-cooked, generally according to conventional sous-vide methods.

In another embodiment, the components combined in the method of the present disclosure include a dry ingredient composition, a protein-containing composition, an alginate composition, and a setting composition, which are combined and processed to provide a "hash-," "minced-," "loaf-," or "hybrid-type" food product. These food products differ from the "chunk" and "chunk and gravy" food products primarily with respect to the smaller finished size of the restructured meat pieces and restructured meat-analogue pieces.

In one aspect of this embodiment, the dry ingredient composition, the protein-containing composition, and the alginate composition are all mixed together to provide a homogeneous mass using, for example, a single or double ribbon mixer, a horizontal mixer with a single blade, or a planetary mixer. In one aspect of this embodiment, a metered stream of the setting composition is added to the mixer while the dry ingredient, protein-containing composition, and alginate compositions are mixing, to initiate and maintain a controlled-rate gelation reaction. The rate of the gelling reaction is controlled, e.g., by the pH of the composition, the concentration of alginate, and the concentration and pH-dependent solubility of the divalent-cation-containing salts of the setting solution. In this embodiment, mixing is continued to shape and size the food product to the desired structure for inclusion in the "hash-," "minced-," "loaf-," or "hybrid-type" food product intended. Again, the weight ratio of the mixture includes, on a weight % basis (as compared to the total weight of the food product), about 20% dry ingredient composition, about 50% protein containing composition, about 10% alginate composition, and about 10% setting composition, expressed as % of the total weight of the food product.

In one embodiment, the smaller-sized shaped meat and meat-analogue pieces are combined with a gravy or with both a gravy and inclusions, and the combination mixed until homogeneous. In one aspect of this embodiment, the mixed "hash-," "minced-," "loaf-," or "hybrid-type" food product is then pumped to suitable containers, e.g., cans, which are sealed and retorted generally according to conventional procedures. In another aspect of this embodiment, the mixed "hash-," "minced-," "loaf-," or "hybrid-type" food product is transferred to suitable plastic bags and vacuum-cooked, generally according to conventional sous-vide methods.

The dry ingredient composition comprises a mixture of one or more carbohydrate sources. Suitable carbohydrate sources include, for example, carbohydrates selected from the group consisting of oat fiber, cellulose, peanut hull, beet pulp, parboiled rice, corn starch, corn gluten meal and mixtures thereof. It is important to note that by properly balancing carbohydrate sources, one skilled in the art can manipulate the texture of the final product. For example, short chain polysaccharides tend to be sticky and gooey and longer chain polysaccharides are less sticky and gooey than the shorter chain. Accordingly, the texture of food product can be influenced by the use, e.g., of longer chain polysaccharides and modified starches, including native or modified starches, cellulose and the like. The carbohydrate can be included in the composition in an amount of about 25% to about 90% by weight of the composition.

The dry ingredient composition may additionally comprise optional components such as added salt, spices, seasonings, vitamins, minerals, flavorants, colorants, and the like. The amount of such additives is at least partially dependent on the nutritional requirements for different life stages of animals. Contemplated vitamins generally useful as food additives include, for example, vitamin A, vitamin B1, vitamin B2, vitamin B6, vitamin B12, vitamin C, vitamin D, vitamin E, vitamin K, biotin, folic acid, inositol, niacin, and pantothenic acid. Contemplated minerals and trace elements generally useful as food additives include, for example, calcium, phosphorus, sodium, potassium, magnesium, copper, zinc, choline, and iron salts.

In one embodiment, a pet food composition according to the present disclosure that comprises a food product prepared by the methods disclosed herein, provides a substantially nutritionally complete diet for an animal; i.e., a diet that includes sufficient nutrients for maintenance of normal health of a healthy animal on the diet.

The animal to which the composition is fed can be human or non-human. In various embodiments, the animal is a vertebrate, for example a fish, a bird, a reptile or a mammal. Illustratively among mammals, the animal can be a member of the order Carnivora, including, without limitation, canine and feline species.

In a particular embodiment, the animal is a companion animal. A "companion animal" herein is an individual animal of any species kept by a human caregiver as a pet, or any individual animal of a variety of species that have been widely domesticated as pets, including dogs (*Canis familiaris*) and cats (*Felis domesticus*), whether or not the individual animal is kept solely or partly for companionship. Thus, "companion animals" herein include working dogs, farm cats kept for rodent control, etc., as well as pet dogs and cats.

Notwithstanding these illustrative embodiments, the methods of this invention also are generally suitable for the preparation of food products and food compositions for other mammals, including non-human mammals such as non-human primates (e.g., monkeys, chimpanzees, etc.), companion and working animals (e.g., horses, etc.), farm animals (e.g., goats, sheep, pigs, cattle, etc.), and wild and zoo animals (e.g., wolves, bears, deer, etc.). The methods of this disclosure also are generally suitable for preparation of food products and food compositions for use with non-mammalian animals, such as companion, farm, zoo, and wild birds, (including, for example, song birds, parrots, ducks, geese, chickens, turkeys, ostriches, etc.).

EXAMPLES

This invention can be further illustrated by the following examples of particular embodiments thereof, although it will be understood that these examples are included merely for purposes of illustration and are not intended to limit the scope of the invention unless otherwise specifically indicated.

The Examples describe the preparation of pet food compositions comprising food products prepared by the method disclosed herein. The Examples include the preparation of dry ingredient, alginate, setting, protein-containing, and gravy compositions, the combination of the dry ingredient, alginate, and protein-containing compositions to provide a first mixture, mixing of the first mixture with a setting solution to effect a gelation reaction product, wherein the setting solution comprises a source of calcium ions, processing of the gelation reaction product to provide a food product, and mixing of the gravy composition and food product to provide the pet food composition.

Example 1

A dry ingredient composition is prepared by combining weighed amounts of each of the components of Table 1 in a suitable container and mixing the ingredients using any suitable mixing device to provide a substantially homogenous mixture.

TABLE 1

DRY INGREDIENT COMPOSITION

| Ingredient | Weight % of the Dry Ingredient Composition |
|---|---|
| Rice Flour | 59.4 |
| Wheat Flour | 19.3 |
| Cellulose Powder | 8.7 |
| Ground Flax Seed | 6.3 |
| Ground Beet Pulp | 4.8 |
| Mineral Mix | 0.4 |
| Vitamin Mix | 0.3 |
| Sodium Tripolyphosphate | 0.2 |
| Taurine | 0.2 |
| Vitamin Mix | 0.14 |
| Choline Chloride | 0.14 |
| L-Carnitine | 0.1 |

The alginate composition is prepared by hydrating the ingredients of Table 2 in water using an in-line or batch type high shear mixer under conditions sufficient to provide a substantially homogenous mixture.

TABLE 2

ALGINATE COMPOSITION

| Ingredient | Weight % of the Alginate Composition |
|---|---|
| Water | 91.3 |
| Soybean Oil | 4.6 |
| Potassium Alginate | 4.1 |

The setting composition is prepared by combining the ingredients of Table 3 with the required amount of water in any suitable container and mixing that combination for a time sufficient to provide a substantially-homogenous mixture.

TABLE 3

SETTING COMPOSITION

| Ingredient | Weight % of the Setting Composition |
|---|---|
| Water | 63.6 |
| Chicken Liver Digest | 23.6 |
| Calcium Chloride | 8.2 |
| Dicalcium Phosphate | 4.2 |
| Guar Gum | 0.5 |

The protein-containing composition is prepared using the animal meats and meat by-products of Table 4. These materials are obtained as frozen blocks and ground through 0.32 to 1.27 cm plates using conventional meat processing equipment. The ground meat is mixed to provide a substantially homogenous mixture.

TABLE 4

PROTEIN CONTAINING COMPOSITION

| Ingredient | Weight % of the Protein Containing Composition |
|---|---|
| Chicken | 23.9 |
| Pork liver | 23.9 |
| Pork lung | 23.9 |

The gravy composition is prepared by combining each of the ingredients of Table 5 with the required amount of water in a suitable container and mixing, e.g., using a high-shear mixer, until a substantially homogenous mixture is obtained.

TABLE 5

GRAVY COMPOSITION

| Ingredient | Weight % of the Gravy Composition |
|---|---|
| Water | 93.6 |
| Corn Starch | 4.5 |
| Caramel Color | 0.9 |
| Guar Gum | 0.7 |
| Carrageenan | 0.3 |
| Red Iron Oxide Color | 0.01 |

The dry ingredient composition, protein-containing composition, and alginate composition are mixed together to provide a homogenous mass referred to herein as the first mixture. The suitably-homogenous first mixture is then pumped to a helical static mixer fitted with a t-pipe at the inlet. The remaining open port of the inlet is connected to a pump that meters the setting composition into the center of the static helical mixer at the inlet. The metered first mixture and setting solution are combined and mixed in the helical static mixer, at a ratio of 10 parts first mixture to 1 part setting composition, to initiate the calcium ion induced gelation reaction. The folding action of the helical static mixer also produces a striated, meat-like appearance observed in the food product.

In one instance, the product of the gelation reaction is extruded from the outlet of the static mixer and cut to the appropriate size with a variable speed rotary knife, providing food products of variable length. In another instance, the product of the gelation reaction is extruded from the outlet of the static mixer and conveyed to a multi-dimensional dicer, where both length and width are altered to fit the food product requirements.

The composition of representative food products are provided in Table 6 below.

TABLE 6

FOOD PRODUCT COMPOSITION

| Process Stream/Ingredient | Weight % of Food Product |
|---|---|
| Protein Containing Composition | 43.5 |
| Alginate Composition | 22.7 |
| Dry Ingredient Composition | 21.4 |
| Setting Composition | 11.4 |
| Liquid Chicken Fat | 1.03 |

In one instance, the food product strips or chunks (depending on the processing), are combined with gravy, and optional inclusions (e.g., potatoes, carrots, peas, peppers), each according to their assigned formula amounts, and mixed by means of a single, double, or planetary mixer with a paddle attachment. When mixed to a homogenous mixture, the mixture is pumped to a can line seamer/filler by means of a pump and the cans are processed according to conventional can line specifications. In other instances, the food product strips or chunks are deposited directly into the can first followed by deposition of a mixture of the gravy composition and inclusion ingredients. The canned products are then processed in a standard retort process.

In another instance, the food product strips or chunks (depending on the processing), are combined with gravy, and optional inclusions (e.g., potatoes, carrots, peas, peppers), each according to their assigned formula amounts, and mixed by means of a single, double, or planetary mixer with a paddle attachment, and the mixture is flash frozen.

In yet another instance, the food product strips or chunks (depending on the processing), are combined with gravy, and optional inclusions (e.g., potatoes, carrots, peas, peppers), each according to their assigned formula amounts, and mixed by means of a single, double, or planetary mixer with a paddle attachment, and the mixture is transferred to appropriate plastic bags and vacuum-cooked according to sous-vide methods known in the art.

In another variation, the methods of the present disclosure are used to prepare food products in a form suitable for inclusion in a hash-type or hybrid-type pet food composition. In this instance, the dry-ingredient composition, protein-containing composition, and alginate composition are mixed together to provide a homogenous mass (referred to herein as the first mixture) in a mass in a double or single ribbon mixer, horizontal mixer with a sigma blade, or a planetary mixer. In this instance, however, while the mixer is mixing the mixture, a steady stream of the setting solution is added to the mixer, initiating the calcium-ion mediated gelation reaction and causing the mixture to form a firm texture. The mixing is continued, thereby processing the product of the gelation reaction into food product pieces to the desired size.

Once the desired size is obtained, the gravy and inclusions can be added to the mixer and the mixture is mixed until homogenous. Once fully mixed, the mixture is pumped to a can line seamer/filler by means of a pump and the cans are processed according to conventional can line specifications, and the canned products are processed in standard retort processes.

In another instance, hash-type or hybrid-type food composition is flash frozen.

In yet another instance, hash-type or hybrid-type food composition is transferred to appropriate plastic bags and vacuum-cooked according to sous-vide methods known in the art.

A typical composition of food products prepared according to the disclosed methods is provided in Table 7.

TABLE 7

FOOD PRODUCT INGREDIENT PROFILE

| Ingredient | % of Food Product |
|---|---|
| Rice Flour | 6.7 |
| Wheat Flour | 2.2 |
| Cellulose Powder | 0.98 |
| Ground Flax Seed | 0.7 |
| Ground Beet Pulp | 0.55 |
| Mineral Mix | 0.04 |
| Vitamin Mix | 0.03 |
| Sodium Tripolyphosphate | 0.02 |
| Taurine | 0.02 |
| Vitamin Mix | 0.02 |
| Choline Chloride | 0.02 |
| L-Carnitine | 0.01 |
| Chicken | 7.7 |
| Pork Liver | 7.7 |
| Pork Lung | 7.7 |
| Soybean Oil | 0.55 |
| Potassium or Sodium Alginate | 0.5 |
| Chicken Liver Digest | 1.4 |
| Calcium Chloride | 0.5 |
| Dicalcium Phosphate | 0.3 |
| Guar Gum | 0.33 |
| Corn Starch | 1.9 |
| Caramel Color | 0.4 |
| Carrageenan | 0.1 |
| Red Iron Oxide Color | 0.005 |
| Water | 55.2 |

A typical composition of a pet food composition comprising food product pieces prepared according to the disclosed methods is provided in Table 8.

TABLE 8

PET FOOD COMPOSITION

| Process Stream/Ingredient | Weight % of the Pet Food Composition |
|---|---|
| Formed Meat Piece | 51.0 |
| Gravy | 45.0 |
| Frozen or Dehydrated Carrots | 1.0 |
| Frozen Peas | 1.0 |
| Frozen or Dehydrated Potatoes | 1.0 |
| Frozen or Dehydrated Red Peppers | 1.0 |

Example 2

Food compositions having a low protein content were prepared. Food Composition A was prepared by mixing a dry ingredient composition, a protein-containing composition, and an alginate composition to form a homogenous mixture. A setting composition was added to the homogeneous mixture. Food Composition B was prepared by mixing a dry ingredient composition, a protein-containing composition, and water to form a homogenous mixture. A setting composition was added to the homogeneous mixture.

Food Compositions A and B had the same ingredients except water was substituted in Food Composition B for the potassium alginate in Food Composition A.

The dry ingredient composition was prepared by combining corn starch, sucrose, flax seed, egg white, dried whey, choline chloride, potassium chloride, vitamin mix, magnesium oxide, taurine, sodium chloride and ferrous sulfate in a suitable container and mixing the ingredients using any suitable mixing device to provide a substantially homogenous mixture.

The alginate composition was prepared by hydrating the ingredients of Table 9 in water using an in-line or batch type high shear mixer under conditions sufficient to provide a substantially homogenous mixture.

TABLE 9

ALGINATE COMPOSITION

| Ingredient | Food Composition A- Weight % of the Alginate Composition | Food Composition B- Weight % of the Alginate Composition |
|---|---|---|
| Water | 96.5 | 100.0 |
| Potassium Alginate | 3.5 | 0 |

The amounts by weight % of the pet food composition for the ingredients in the alginate composition are in Table 10.

TABLE 10

ALGINATE COMPOSITION

| Ingredient | Food Composition A- Weight % of the Pet Food Composition | Food Composition B- Weight % of the Pet Food Composition |
|---|---|---|
| Water | 12.5 | 13.0 |
| Potassium Alginate | 0.5 | 0 |

The setting composition was prepared by combining the ingredients of Table 11 with the required amount of water in any suitable container and mixing that combination for a time sufficient to provide a substantially-homogenous mixture.

TABLE 11

SETTING COMPOSITION

| Ingredient | Weight % of the Setting Composition |
|---|---|
| Water | 77.7 |
| Chicken Liver Digest | 8.9 |
| Calcium Chloride | 5.9 |

TABLE 11-continued

SETTING COMPOSITION

| Ingredient | Weight % of the Setting Composition |
|---|---|
| Dicalcium Phosphate | 2.6 |
| Puracal Cal Lac | 0.03 |
| Guar Gum | 0.005 |

The amounts by weight % of the pet food composition for the ingredients in the setting composition are in Table 12.

TABLE 12

SETTING COMPOSITION

| Ingredient | Weight % of the Pet Food Composition |
|---|---|
| Water | 4.4 |
| Chicken Liver Digest | 0.5 |
| Calcium Chloride | 0.3 |
| Dicalcium Phosphate | 0.15 |
| Guar Gum | 0.03 |

The protein-containing composition was prepared using pork liver.

The amounts by weight % of the pet food composition for the pork liver in the protein-containing composition are in Table 13.

TABLE 13

PROTEIN CONTAINING COMPOSITION

| Ingredient | Weight % of the Pet Food Composition |
|---|---|
| Pork liver | 9.4 |

The gravy composition is prepared by combining each of the ingredients of Table 14 with the required amount of water in a suitable container and mixing, e.g., using a high-shear mixer, until a substantially homogenous mixture is obtained.

TABLE 14

GRAVY COMPOSITION

| Ingredient | Weight % of the Gravy Composition |
|---|---|
| Water | 94.5 |
| Rice Starch | 4.1 |
| Guar Gum | 0.5 |
| Color | 0.3 |
| Locust Bean Gum | 0.2 |

Food Compositions A and B were prepared by the same process. The dry ingredient composition, protein-containing composition, and alginate composition (water for Food Composition B) were mixed together to provide a homogenous mass. The homogeneous mass was then pumped to a helical static mixer fitted with a t-pipe at the inlet. The homogenous mass and setting solution were combined and mixed in a helical static mixer. The mixture was extruded from the outlet of the static mixer and cut to the appropriate size with a variable speed rotary knife, providing food products of variable length.

The amounts of protein-containing, alginate, dry ingredient and setting compositions are provided in Table 15 below:

TABLE 15

FOOD PRODUCT

| Process Stream/Ingredient | Weight % of Food Product |
|---|---|
| Protein Containing Composition | 43.5 |
| Alginate Composition | 22.7 |
| Dry Ingredient Composition | 21.4 |
| Setting Composition | 11.4 |
| Liquid Chicken Fat | 1.03 |

Food Composition A formed a chunk product having a well-defined structure. Food Composition B formed a dough-like mass having no defined structure. Using a TA-TX2 texture analyzer with a TA-65 Multi-Puncture ring (Texture Technologies Corp), the texture of the food compositions was measured. The results (Table 16) show that Food Composition A with the potassium alginate had a harder texture than Food Composition B without the potassium alginate.

TABLE 16

TEXTURE AFTER MIXING

| Time (min) | Texture-Food Composition A (g) | Texture-Food Composition B (g) |
|---|---|---|
| 0 | 1194 | 43 |
| 15 | 1623 | 49 |
| 60 | 2035 | 52 |
| 150 | 2747 | 74 |

Food Compositions A and B were mixed with a gravy mixture and dispensed into 13-oz cans and were processed by a standard retort process.

Food Composition A formed a soft loaf product whereas Food Composition B did not. Using a TA-TX2 texture analyzer with a TA-65 Multi-Puncture ring (Texture Technologies Corp), the texture of the food compositions was measured. The results (Table 19) show that, after retort, Food Composition A had a harder texture than Food Composition B.

TABLE 17

TEXTURE AFTER RETORT

| Texture-Food Composition A (g) | Texture-Food Composition B (g) |
|---|---|
| 1850 | 700 |

The Nutritional analysis of Food Composition A is listed in Table 18.

TABLE 18

NUTRITIONAL ANALYSIS

| Ingredient | Amount-Dry Matter Basis |
|---|---|
| Protein | 14.3% |
| Fat | 25.0% |
| Carbohydrate (NFE) | 56.1% |

TABLE 18-continued

NUTRITIONAL ANALYSIS

| Ingredient | Amount-Dry Matter Basis |
|---|---|
| Crude Fiber | 0.7% |
| Calcium Chloride | 0.3% |
| Potassium Alginate | 0.5% |

Example 3

Food compositions with and without alginate were prepared and evaluated against a commercially available product. Food Composition C was prepared by mixing a dry ingredient composition, a protein-containing composition, and an alginate composition to form a homogenous mixture. A setting composition was added to the homogeneous mixture. Food Composition D was prepared by mixing a dry ingredient composition, a protein-containing composition, and a liquid composition to form a homogenous mixture.

Preparation of Food Composition C: The dry ingredient composition was prepared by combining rice flour, wheat flour, cellulose, flax seed, beet pulp, mannose, vitamin mix, taurine, sodium tripolyphosphate, choline chloride, and carnitine in a suitable container and mixing the ingredients using any suitable mixing device to provide a substantially homogenous mixture.

The alginate composition was prepared by hydrating the ingredients of Table 19 in water using an in-line or batch type high shear mixer under conditions sufficient to provide a substantially homogenous mixture.

TABLE 19

ALGINATE COMPOSITION

| Ingredient | Food Composition C-Weight % of the Alginate Composition |
|---|---|
| Water | 91.3 |
| Soybean oil | 4.6 |
| Potassium Alginate | 4.1 |

The amounts by weight % of the pet food composition for the ingredients in the protein-containing composition are in Table 20.

TABLE 20

ALGINATE COMPOSITION

| Ingredient | Food Composition C-Weight % of the Pet Food Composition |
|---|---|
| Water | 10.0 |
| Soybean oil | 0.5 |
| Potassium Alginate | 0.5 |

The setting composition was prepared by combining the ingredients of Table 21 with the required amount of water in any suitable container and mixing that combination for a time sufficient to provide a substantially-homogenous mixture.

TABLE 21

SETTING COMPOSITION

| Ingredient | Weight % of the Pet Food Composition |
|---|---|
| Water | 63.5 |
| Chicken Liver Digest | 23.6 |
| Calcium Chloride | 8.2 |
| Dicalcium Phosphate | 4.2 |
| Guar Gum | 0.5 |

The amounts by weight % of the pet food composition for the ingredients in the setting composition are in Table 22.

TABLE 22

SETTING COMPOSITION

| Ingredient | Weight % of the Pet Food Composition |
|---|---|
| Water | 3.5 |
| Chicken Liver Digest | 1.3 |
| Calcium Chloride | 0.45 |
| Dicalcium Phosphate | 0.23 |
| Guar Gum | 0.03 |

The protein-containing composition was prepared using chicken, pork liver and pork lung. The ground meat was mixed to provide a substantially homogenous mixture.

The amounts by weight % of the pet food composition for the chicken, pork liver and pork lung are in Table 23.

TABLE 23

PROTEIN CONTAINING COMPOSITION

| Ingredient | Weight % of the Pet Food Composition |
|---|---|
| Chicken | 7.0 |
| Pork liver | 7.0 |
| Pork lung | 7.0 |

Preparation of Food Composition D: The dry ingredient composition was prepared by combining rice flour, wheat flour, cellulose, dextrose, flax seed, guar gum, beet pulp, calcium chloride, dical phosphate, potassium sulfate, mannose, vitamin mix, sodium tripolyphosphate, taurine, choline chloride, and carnitine a suitable container and mixing the ingredients using any suitable mixing device to provide a substantially homogenous mixture.

A liquid composition was prepared by mixing the ingredients of Table 24.

TABLE 24

LIQUID COMPOSITION

| Ingredient | Food Composition D-Weight % of the Liquid Composition |
|---|---|
| Water | 96.1 |
| Chicken Liver Digest | 2.0 |
| Soybean oil | 0.8 |
| Chicken Fat | 0.8 |

The amounts by weight % of the pet food composition for the ingredients in the liquid composition are in Table 25.

TABLE 25

LIQUID COMPOSITION

| Ingredient | Food Composition D-Weight % of the Food Composition |
|---|---|
| Water | 63.5 |
| Chicken Liver Digest | 1.3 |
| Soybean oil | 0.5 |
| Chicken Fat | 0.5 |

The protein-containing composition was prepared using chicken, pork liver and pork lung. The ground meat was mixed to provide a substantially homogenous mixture.

The amounts by weight % of the chicken, pork liver and pork lung in the pet food composition are in Table 26.

TABLE 26

PROTEIN CONTAINING COMPOSITION

| Ingredient | Weight % of the Pet Food Composition |
|---|---|
| Chicken | 7.0 |
| Pork liver | 7.0 |
| Pork lung | 7.0 |

The Nutritional analysis of Food Compositions C and D are listed in Table 27.

TABLE 27

NUTRITIONAL ANALYSIS

| Ingredient | Food Composition C: Amount-Dry Matter Basis | Food Composition D: Amount-Dry Matter Basis |
|---|---|---|
| Protein | 23.2% | 23.5% |
| Fat | 16.9% | 17.1% |
| Carbohydrate (NFE) | 48.1% | 47.4% |
| Crude Fiber | 6.4% | 6.5% |
| Calcium Chloride | 0.45% | 0.44% |
| Potassium Alginate | 0.45% | 0% |

Food Composition C was prepared by mixing the dry ingredient composition, protein-containing composition, and alginate composition to provide a homogenous mass. The homogenous mass and setting solution were combined and mixed.

A gravy composition was prepared by mixing the ingredients in Table 28.

TABLE 28

PROTEIN CONTAINING COMPOSITION

| Ingredient | Weight % of the Pet Food Composition |
|---|---|
| Water | 95.9 |
| Dextrose | 1.5 |
| Cellulose powder | 1.0 |
| Guar gum | 1.0 |
| Color caramel | 0.6 |

A gravy composition was added to the homogeneous mass and mixed. The mixture was dispensed into cans and processed by a standard retort process.

Food Composition D was prepared by mixing the dry ingredient composition, the liquid composition, and the protein-containing composition to form a homogeneous mass. A gravy composition was added to the homogeneous mass and mixed. The mixture was dispensed into cans and processed by a standard retort process.

Prior to retort, Food Composition C formed a product having a well-defined structure and Food Composition D formed a dough-like mass having no defined structure. Using a TA-TX2 texture analyzer with a TA-65 Multi-Puncture ring (Texture Technologies Corp), the texture of the food compositions was measured. The results (Table 29) show that Food Composition C with the potassium alginate had a harder texture than Food Composition D without the potassium alginate.

TABLE 29

TEXTURE AFTER RETORT

| | Texture-Food Composition C | Texture-Food Composition D | Texture-Food Composition C&G |
|---|---|---|---|
| Average Force (g) | 1064 | 134 | 3197 |
| Max Force (g) | 1780 | 184 | 7388 |

Food Compositions C and D were visually compared against a commercially-available chunk-and-gravy product (Food Composition CG). The Nutritional Analysis of Food Composition CG is in Table 30.

TABLE 30

NUTRITIONAL ANALYSIS

| Ingredient | Food Composition CG: Amount-Dry Matter Basis |
|---|---|
| Protein | 32.0% |
| Fat | 19.5% |
| Carbohydrate (NFE) | 41.0% |
| Crude Fiber | 3.0% |
| Calcium | 1.1% |

Food Composition CG had uniform pieces with smooth outer surfaces and no inner or outer striations. The piece sizes were very fine. Food Composition C had irregularly-shaped pieces with inner and outer striations, giving the composition a more meat-like appearance.

The methods disclose herein can therefore be used for producing formed meat pieces, particularly retort-stable formed meat pieces of variable size, shape and composition for the production of food compositions comprising those formed meat pieces.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

What is claimed is:

1. A method for preparing a pet food composition, the method comprising:
   preparing a suspension of an alginate composition, wherein preparing the suspension of the alginate composition comprises:

contacting a source of alginate with water;
facilitating dissolution of the source of alginate in water by contacting the source of alginate and the water with an oil, wherein the oil is soybean oil; and
mixing the source of alginate, the oil, and water to prepare the suspension;
mixing a dry ingredient composition, a protein-containing composition, and the suspension of the alginate composition to provide a first mixture;
mixing the first mixture with a setting composition to effect a gelation reaction, wherein the setting composition comprises a source of calcium ions; and
processing the product of the gelation reaction to provide a food product;
combining the food product with a gravy composition to provide a pet food composition,
retorting the pet food composition,
wherein the food product has a stable structure prior to retort,
wherein the pet food composition comprises protein in an amount of less than 25% by weight of the pet food composition on a dry matter basis,
wherein mixing the first mixture with the setting composition comprises pumping the first mixture into a helical static mixer at a first metered rate and pumping the setting composition into the helical static mixer at a second metered rate to initiate the gelation reaction,
wherein the gelation reaction comprises a controlled-rate gelation reaction comprising creation of ionic bonds between alginate polymers mediated by divalent cations of the setting solution,
wherein the first metered rate is greater than the second metered rate,
wherein the food product comprises irregularly-shaped meat-analogue pieces,
wherein the meat-analogue pieces comprise a striated structure, and
wherein the meat-analogue pieces comprises a dimension with a range of from about 5 to about 50 mm.

2. The method of claim 1 wherein the source of calcium ions is in the setting composition in an amount of 0.25 to 20% by weight of the setting composition.

3. The method of claim 1 wherein the source of calcium ions is selected from the group consisting of calcium chloride, calcium lactate, calcium lactate gluconate, and combinations thereof.

4. The method of claim 1 wherein the alginate composition comprises a source of alginate, wherein the source of alginate comprises potassium alginate, sodium alginate, or mixtures thereof.

5. The method of claim 4 wherein the source of alginate is in the alginate composition in an amount of 0.1 to 10% by weight of the alginate composition.

6. The method of claim 4 wherein the source of alginate is potassium alginate.

7. The method of claim 1 wherein the dry ingredient composition comprises a cereal grain, a vegetable fiber, a vitamin mixture, a mineral mixture, a colorant, and a calcium sequestrant.

8. The method of claim 7 wherein the dry ingredient composition further comprises a component selected from the group consisting of taurine, choline, carnitine, and a combination of two or more thereof.

9. The method of claim 1 wherein the protein-containing composition comprises animal proteins, cereal grain proteins, and vegetable proteins.

10. The method of claim 9 wherein the cereal grain protein source is selected from the group consisting of rice flour, wheat flour, rye flour, corn flour, and a combination of two or more thereof.

11. The method of claim 1, wherein the pet food composition comprises protein in an amount of less than 15% by weight of the pet food composition on a dry matter basis.

12. The method of claim 1, wherein the source of calcium ions is in the pet food composition in an amount of 0.01 to 5% by weight of the pet food composition.

13. The method of claim 1, wherein the meat-analogue pieces comprise a dimension with a range of from about 7.5 to about 45 mm.

14. The method of claim 1, wherein the meat-analogue pieces comprise a dimension with a range of from about 10 to about 40 mm.

15. The method of claim 1, wherein the meat-analogue pieces comprise a dimension with a range of from about 12.5 to about 35 mm.

16. The method of claim 1, wherein the meat-analogue pieces comprise a dimension with a range of from about 5 to about 7.5 mm.

17. The method of claim 1, wherein the dry ingredient composition comprises two or more of a cereal grain, a vegetable fiber, a vitamin mixture, a mineral mixture, a colorant, and a calcium sequesterant, and
wherein the dry ingredient composition further comprises one or more of taurine, choline, and carnitine.

18. The method of claim 1, wherein the protein-containing composition consists essentially of non-animal proteinaceous materials.

19. The method of claim 1, wherein the pet food composition does not include animal proteinaceous materials.

20. A method for preparing a food product, the method comprising
preparing a suspension of an alginate composition, wherein preparing the suspension of the alginate composition comprises:
contacting a source of alginate with water;
facilitating dissolution of the source of alginate in water by contacting the source of alginate and the water with an oil, wherein the oil is soybean oil; and
mixing the source of alginate, the oil, and water to prepare the suspension;
mixing a dry ingredient composition, a protein-containing composition, and the suspension of the alginate composition to provide a first mixture, wherein the protein-containing composition comprises a meat component;
mixing the first mixture with a setting composition to effect a gelation reaction, wherein the setting composition comprises a source of calcium ions; and
processing the product of the gelation reaction to provide a food product, wherein the food product has a stable structure prior to retort,
controlling a rate of the gelation reaction, wherein controlling the rate of the gelation reaction comprises:
adjusting the pH level in the first mixture; and
including more than one of calcium chloride, dicalcium phosphate, calcium sulfate and calcium carbonate in the setting composition, and
grinding the meat component through different grindplates to form discrete food particles, wherein the grind plates have a size of about 1.27 cm to about 2.54 cm,
wherein the alginate composition comprises an oil,
wherein mixing the first mixture with the setting composition comprises combining the first mixture and the setting composition at a T-pipe of a helical static mixer to initiate the gelation reaction, wherein the gelation reaction comprises a controlled-rate gelation reaction comprising creation of ionic bonds between alginate polymers mediated by divalent cations of the setting solution, wherein the source of calcium ions comprises an encapsulated calcium source, and wherein a rate of the gelation is controlled by the inclusion of the encapsulated calcium source, wherein the food product comprises irregularly-shaped meat-analogue pieces, wherein the meat-analogue pieces comprise a striated structure, and wherein the meat-analogue pieces comprise a dimension with a range of from about 5 to about 50 mm.

21. The method of claim 20, wherein the encapsulated calcium source comprises encapsulated calcium lactate.

22. A method for preparing a pet food composition, the method comprising:

preparing a suspension of an alginate composition, wherein preparing the suspension of the alginate composition comprises:

contacting a source of alginate with water;

facilitating dissolution of the source of alginate in water by contacting the source of alginate and the water with an oil-based component, wherein the oil-based component is soybean oil; and mixing the source of alginate, the oil-based component, and water to prepare the suspension;

preparing a dry ingredient composition, wherein preparing the dry ingredient composition comprises mixing a cereal grain, a fiber, a vitamin, and a mineral with one another;

mixing the dry ingredient composition, a protein-containing composition, and the suspension of the alginate composition to provide a first mixture;

mixing the first mixture with a setting composition to effect a gelation reaction, wherein the setting composition comprises a source of calcium ions;

processing the product of the gelation reaction to provide a food product;

combining the food product with a gravy composition to provide the pet food composition;

retorting the pet food composition, wherein the food product has a stable structure prior to retort, wherein the pet food composition comprises protein in an amount of less than 25% by weight of the pet food composition on a dry matter basis.

23. The method of claim 22, wherein the protein-containing composition consists essentially of non-animal proteinaceous materials.

24. The method of claim 22, wherein the protein-containing composition consists of non-animal proteinaceous materials.

* * * * *